Oct. 14, 1930.  R. E. BRIGGS  1,778,060
BELT IDLER SUPPORT
Filed May 14, 1926

Patented Oct. 14, 1930

1,778,060

UNITED STATES PATENT OFFICE

ROBERT E. BRIGGS, OF COLUMBUS, OHIO, ASSIGNOR TO THE JEFFREY MANUFACTURING COMPANY, OF COLUMBUS, OHIO, A CORPORATION OF OHIO

BELT-IDLER SUPPORT

Application filed May 14, 1926. Serial No. 109,109.

The present invention relates to certain new and useful improvements in belt idlers supports of the class adapted to the support of conveyor belts, and the like.

I am aware that numerous devices have heretofore been proposed for the support of the idler pulleys over which travels the endless belts used for the transportation of granular and broken material. All of the devices of this class with which I am familiar possess certain inherent defects which it is the object of this invention to overcome.

It is the especial object of this invention to provide improved mechanism for the support of the idler pulleys for conveyor belts, which may be cheaply manufactured, will be reliable in service, durable and efficient in operation, convenient of lubrication, and provided with means for the protection of the anti-friction bearings of the pulleys from dirt and water incident to some classes of service to which the conveyor may be applied.

Figure 1:
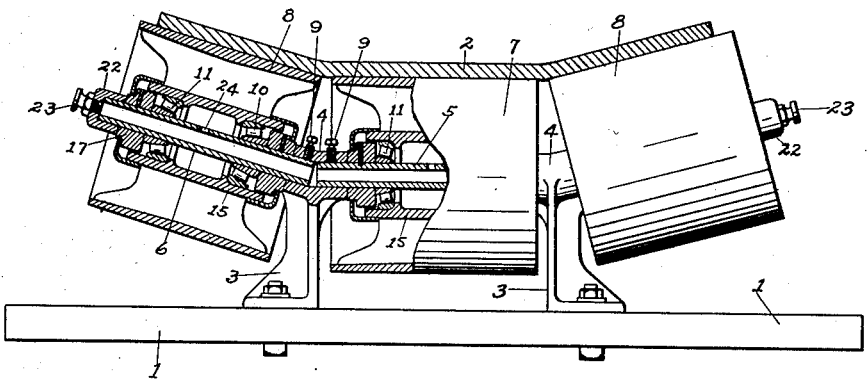

These and other objects are fully set forth in the following specification and illustrated in the accompanying drawings of which Fig. 1, is a side elevation, partly in section of a three pulley idler constructed in accordance with my present invention.

Figure 2:
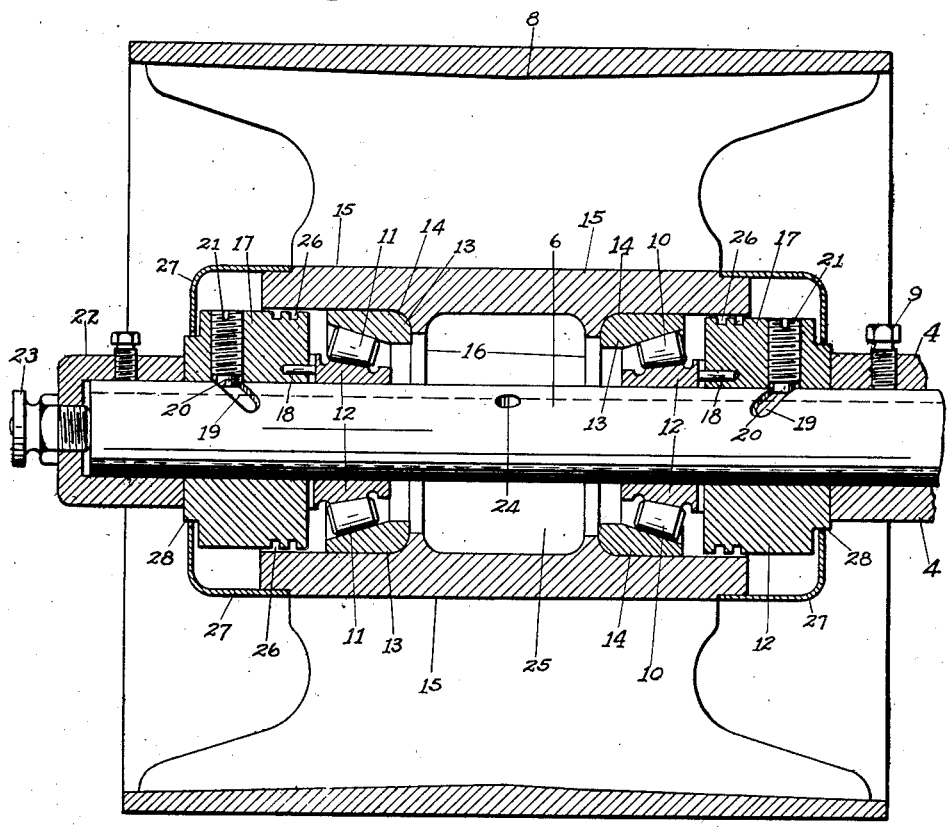

Fig. 2, is a longitudinal sectional view, on an enlarged scale of one of the pulleys of the idler shown in Fig. 1.

Like numerals refer to similar parts in both figures.

In the embodiment of my invention which is illustrated in the drawings the numeral 1 refers to a plank adapted to extend transversely of the conveyor belt 2 and to be secured to any convenient supporting structure. Bolted to the plank 1 are two upright supports 3 on each of which is formed a head portion 4. The head portions 4 are pierced by transversely extending apertures adapted to receive the ends of the shafts 5 and 6 upon which the idler pulleys 7 and 8 are mounted. These parts are so shaped that the middle shaft 5 is supported at both of its ends and lies in a substantially horizontal plane, while the two laterally disposed shafts 6 are supported only at one end and are inclined upwardly to bend the conveyor belt 2 along longitudinal lines and thereby form a trough adapted to prevent spilling of the material carried upon the belt.

In order that the shafts 5 and 6 may be securely held in place I have provided the set screws 9 whereby the shaft may be securely clamped in place, thereby avoiding the accurate machine work which has heretofore been thought to be essential in such constructions.

Each of the pulleys 7 and 8 is supported upon two oppositely disposed bearings 10 and 11 each of which comprises a cone 12 rotatably and slidably mounted upon the shaft 6, and a cooperating ring 13 which is pressed into a socket 14 of the hub 15. Preferably, though not necessarily, anti-friction rollers are interposed between the bearing surfaces of the cone 12 and the ring 13, but such rollers in no way affect the relation of the bearings 10 and 11 to the other elements of the idler. Annular flanges 16, formed in the hub 15 engage the rings 13 to limit their movement inwardly of the sockets 14, and movement of the cones 12 outwardly of the pulleys is prevented by the abutting set collars 17 mounted upon the shaft 6. Dowel pins 18 projecting from the face of the set collars 17 engage radially extending grooves formed in the cones 12 to prevent rotative movement of said cones relative to said collars. Provision is made for the adjustment of the pulley 8 longitudinal of the shaft 6, and of the parts of the bearings 10 and 11 relative to each other by the peculiar method of attaching the set collars 17 to the shaft 6.

Formed in the surface of the shaft 6 are two oppositely inclined spirally disposed grooves 19 which are adapted to receive the end portions 20 of the dog point set screw 21 threaded through a suitable aperture in the set collar 17. The proportions of these parts are such that engagement of the ends 20 with the groove 19 will produce longitudinal movement of the set collar 17 when said set collar is moved rotatively upon the shaft 6, and after the desired adjustment has been obtained, the set screw 21 may be turned to cause engagement of the end portions 20 with the bottom of the groove to securely clamp the parts in adjusted position.

The shafts 5 and 6 are preferably formed of steel tubing and to the end of the shaft 6 is fixed a cap 22 which closes the end of the tube to prevent the escape of grease therefrom, and this cap is provided with an automatically closing grease valve 23 of the well known construction which is adapted to be engaged by a grease gun for the introduction of lubricant to the interior of the shaft. The apertures in the head portions 4 are so shaped as to supply a continuous passage from one end to the other of the line to tubes 5 and 6, and suitable apertures 24 are provided for the flow of grease from the tube into the cavity 25 of the hub 15 between the bearings 10 and 11. Due to the pressure exerted by the grease gun, grease is forced into and through interstices of the bearings 10 and 11, and the collars 17 fit sufficiently close in the sockets 14 to prevent wastage of grease at the ends of the pulley hubs. Annular grooves 26 are formed in the periphery of the collars 17 to form grease traps which effectively seal the bearings against the entrance of dirt or water from the outside. These parts are further protected by a cap 27 pressed upon the end of the hub 15, and having an aperture which fits the shoulder 28 of the set collars 17 with a close running clearance.

By the devices above described, I have provided a simple and inexpensive belt support idler which is durable and efficient in service, and in which the bearings are thoroughly protected from injury by dirt or water incident to service conditions to which such a device may be applied.

It is understood, however, that the devices above described may be subjected to wide variations as to details without departure from the spirit of my invention.

I claim—

1. In an apparatus of the class described, a shaft, a pulley on said shaft, a bearing annulus between said shaft and pulley, and means effective upon rotation of said annulus to adjust the latter longitudinally of said shaft, said same means being also effective to lock said annulus against rotation in adjusted position.

2. In an apparatus of the class described, a shaft, a pulley on said shaft, a bearing annulus between said shaft and pulley, and means in connection with said annulus adapted upon movement about said shaft to adjust said annulus longitudinally of the latter, said same means being also effective to lock said annulus against rotation in adjusted position.

3. In an apparatus of the class described, a shaft, a pulley on said shaft, a bearing annulus between said shaft and pulley, and means engaging in a spiral groove of said shaft adapted upon movement about the latter to adjust said annulus axially, said means being also adapted to engage said groove for locking said annulus in adjusted position.

4. In an apparatus of the class described, the combination with a shaft, of a pulley, a journal bearing adapted to support said pulley on said shaft, said bearing comprising a cone slidable longitudinally of said shaft, means to adjust said bearing comprising a collar and means effective upon rotary movement of said collar to produce longitudinal movement thereof relative to said shaft, said same means being also adapted to be moved to lock said collar against rotation in adjusted position as and for the purpose set forth.

5. In an apparatus of the class described, the combination with a shaft, of a pulley, a journal bearing adapted to support said pulley on said shaft, said bearing comprising a cone slidable longitudinally of said shaft, means to adjust said bearing comprising a collar and a set screw projecting through said collar adapted to engage a spirally disposed groove formed in said shaft to produce longitudinal movement of said collar when it is rotated relative to said shaft as and for the purpose set forth.

6. In an apparatus of the class described, the combination with a shaft, of a pulley, a journal bearing adapted to support said pulley on said shaft, said bearing comprising a cone slidable longitudinally of said shaft, means to adjust said bearing, comprising a collar and a set screw projecting through said collar adapted to engage a spirally disposed groove in said shaft to produce longitudinal movement of said collar when it is rotated relative to said shaft, said set screw being also adapted to lock said collar in adjusted position upon said shaft as and for the purpose set forth.

7. In an apparatus of the class described, the combination with a shaft, of a rotary member, a journal bearing adapted to support said rotary member on said shaft, said bearing comprising a cone slidable and rotatable upon said shaft, means to adjust said bearing, comprising a collar and means effective upon rotary movement of said collar to produce longitudinal movement thereof relative to said shaft, and said same means being independently movable to prevent rotary movement of said cone relative to said collar as and for the purpose set forth.

8. In an apparatus of the class described, the combination with a shaft, of a pulley, a journal bearing adapted to support said pulley on said shaft, said bearing comprising a cone rotatable and slidable upon the shaft, means to adjust said bearing, comprising a collar and means effective upon rotary movement of said collar to produce longitudinal movement thereoof relative to said shaft, and a dowel pin projecting from the face of said collar adapted to engage a recess in the base of said cone, as and for the purpose set forth.

9. In an apparatus of the class described, the combination with a shaft, of a pulley, a journal bearing adapted to support said pulley on said shaft, said bearing comprising a cone slidable longitudinally of said shaft and a cooperating ring mounted in a cylindrical recess of said pulley, an adjusting collar abutting said cone, and a shield attached to said pulley adapted to cooperate with said collar to close said recess, as and for the purpose set forth.

10. Adjusting means comprising a member mounted upon a shaft and provided with means effective upon rotation of said member to adjust the latter longitudinally of said shaft, and said same means being solely effective to lock said member against rotation in adjusted position.

11. Adjusting means comprising a member mounted upon a shaft having a cam groove, and said member having a set screw with its end engaging said groove whereby rotation of said member causes its adjustment longitudinally of said shaft and tightening of said set screw locks said member against rotation.

12. Adjusting means comprising a member mounted upon a shaft and provided with means effective upon rotation of said member to adjust the latter longitudinally of said shaft, and said same means being rotatable to lock said member against rotation in adjusted positions.

13. In an apparatus of the class described, a shaft, a pulley on said shaft, a bearing annulus between said shaft and pulley, and means effective upon rotation of said annulus to adjust the latter longitudinally of said shaft, said same means being also rotatable to lock said annulus against rotation in adjusted positions.

14. In an apparatus of the class described, a shaft, a pulley on said shaft, a threadless bearing annulus between said shaft and pulley, and means effective upon rotation of said annulus to adjust the latter longitudinally of said shaft, said same means being also effective to lock said annulus against rotation in adjusted positions.

In testimony whereof I have hereunto set my hand.

ROBERT E. BRIGGS.